(12) United States Patent
Campbell et al.

(10) Patent No.: US 7,137,208 B2
(45) Date of Patent: *Nov. 21, 2006

(54) LEVELING DEVICE

(75) Inventors: Ray F. Campbell, Newport Beach, CA (US); Joan D. Wada, Anaheim, CA (US)

(73) Assignee: The Boeing Company, Chicago, IL (US)

( * ) Notice: Subject to any disclaimer, the term of this patent is extended or adjusted under 35 U.S.C. 154(b) by 121 days.

This patent is subject to a terminal disclaimer.

(21) Appl. No.: 10/905,077

(22) Filed: Dec. 14, 2004

(65) Prior Publication Data

US 2006/0123643 A1    Jun. 15, 2006

(51) Int. Cl.
  *G01P 15/00*    (2006.01)
  *G01C 9/06*    (2006.01)
(52) U.S. Cl. .................................................. 33/366.13
(58) Field of Classification Search .............. 33/366.13
  See application file for complete search history.

(56) References Cited

U.S. PATENT DOCUMENTS

| | | | |
|---|---|---|---|
| 2,696,566 A | 12/1954 | Lion | |
| 2,711,590 A | 6/1955 | Wilcox | |
| 3,186,101 A | 6/1965 | Walpert | |
| 3,226,981 A | 1/1966 | Mullins et al. | |
| 3,290,786 A | 12/1966 | Parkin | |
| 3,417,626 A | 12/1968 | Riordan | |
| 3,746,281 A | 7/1973 | Stripling | |
| 4,470,562 A | 9/1984 | Hall et al. | |
| 4,507,737 A * | 3/1985 | LaSarge et al. ............. | 701/220 |
| 4,583,296 A | 4/1986 | Dell'Acqua | |
| 4,601,206 A | 7/1986 | Watson | |
| 4,792,676 A | 12/1988 | Hojo et al. | |
| 4,912,397 A | 3/1990 | Gale et al. | |
| 4,987,779 A | 1/1991 | McBrien | |
| 5,008,774 A | 4/1991 | Bullis et al. | |
| 5,031,330 A * | 7/1991 | Stuart ....................... | 33/366.12 |
| 5,079,847 A | 1/1992 | Swartz et al. | |
| 5,124,938 A | 6/1992 | Algrain | |
| 5,146,417 A | 9/1992 | Watson | |
| 5,180,986 A | 1/1993 | Swartz et al. | |
| 5,191,713 A * | 3/1993 | Alger et al. .................. | 33/315 |
| 5,283,528 A | 2/1994 | van Seeters | |
| 5,325,065 A | 6/1994 | Bennett et al. | |
| 5,383,363 A | 1/1995 | Kulmaczewski | |
| 5,415,040 A | 5/1995 | Nottmeyer | |
| 5,454,266 A | 10/1995 | Chevroulet et al. | |
| 5,456,111 A | 10/1995 | Hulsing, II | |
| 5,461,319 A | 10/1995 | Peters | |
| 5,495,414 A | 2/1996 | Spangler et al. | |
| 5,597,956 A | 1/1997 | Ito et al. | |
| 5,774,996 A | 7/1998 | Ogawa et al. | |

(Continued)

FOREIGN PATENT DOCUMENTS

EP    585862 A1    3/1994

(Continued)

*Primary Examiner*—Christopher W. Fulton
(74) *Attorney, Agent, or Firm*—Ostrager Chong Flaherty & Broitman

(57) ABSTRACT

A leveling system for a missile system includes a holder defining an xz-plane. Four flexure plate accelerometers are coupled to the holder at angles such that they are sensitive to movement in an xy-plane. The accelerometers all generate signals in response to movements of the flexure plates. An actuator activates an object control device in response to a platform control signal. A processor receives the accelerometer signals and generates the platform control signal in response thereto.

21 Claims, 7 Drawing Sheets

U.S. PATENT DOCUMENTS

| | | |
|---|---|---|
| 5,801,309 A | 9/1998 | Carr et al. |
| 5,801,313 A | 9/1998 | Horibata et al. |
| 5,831,164 A | 11/1998 | Reddi et al. |
| 5,861,754 A | 1/1999 | Ueno et al. |
| 5,905,203 A | 5/1999 | Flach et al. |
| 5,969,250 A | 10/1999 | Greiff |
| 5,986,497 A | 11/1999 | Tsugai |
| 6,128,955 A * | 10/2000 | Mimura ............... 73/510 |
| 6,230,566 B1 | 5/2001 | Lee et al. |
| 6,293,148 B1 | 9/2001 | Wang et al. |
| 6,338,199 B1 | 1/2002 | Chigira et al. |
| 6,449,857 B1 | 9/2002 | Anikolenko |
| 6,467,346 B1 | 10/2002 | Challoner et al. |
| 6,609,037 B1 | 8/2003 | Bless et al. |
| 6,622,647 B1 | 9/2003 | DePoy |
| 6,662,654 B1 | 12/2003 | Miao et al. |
| 6,688,013 B1 | 2/2004 | Greway |
| 6,701,788 B1 | 3/2004 | Babala |
| 6,731,121 B1 | 5/2004 | Hsu et al. |
| 6,776,043 B1 | 8/2004 | Campbell et al. |
| 6,785,975 B1 * | 9/2004 | Campbell et al. .............. 33/356 |
| 6,810,739 B1 * | 11/2004 | Campbell et al. ........ 73/514.01 |
| 2002/0005297 A1 | 1/2002 | Alft et al. |
| 2002/0190607 A1 | 12/2002 | Padden et al. |
| 2003/0079543 A1 | 5/2003 | Potter |

FOREIGN PATENT DOCUMENTS

| | | |
|---|---|---|
| JP | 06082469 A | 3/1994 |

* cited by examiner

LEVELING DEVICE

CROSS REFERENCE TO RELATED APPLICATIONS

The present invention is related to application Ser. No. 10/604,563 entitled "Accelerometer Augmented Leveling Device," filed on Jul. 30, 2003 and incorporated by reference herein.

BACKGROUND OF INVENTION

The present invention relates generally to leveling devices, and more particularly, to an accelerometer augmented leveling device.

It is well known that aerospace systems, such as missile systems, require internal control systems for the purpose of maintaining a particular level or attitude with respect to a fixed frame, such as the earth.

Currently, spirit levels or bubble level devices are used in conjunction with missile navigation systems to maintain a particular attitude of an object prior to launch or during flight thereof.

Typical spirit levels include a closed glass tube (vial) having a circular cross section and a center line also defining a circular arc. The internal surface thereof is filled with ether or low viscosity liquid with enough free space remaining for the formation of a bubble of air and other gasses.

Spirit levels are, however, subject to condensation and fluid breakdown over time, resulting in loss of efficiency and accuracy.

As was mentioned, this type of leveling device is used in aerospace or in a portion of aircraft or spacecraft navigation or guidance systems. During operation of those system types, the temperature in the operating environment of the spirit level changes over a wide range. Consequently, leveling must be measured and controlled with a high accuracy over a wide range of temperatures and temperature gradients. This is often a difficult and inefficient process.

The disadvantages associated with current leveling systems have made it apparent that a new leveling system is needed. The new leveling system should eliminate fluid breakdown, substantially minimize temperature sensing requirements, and should also improve leveling detection accuracy. The present invention is directed to these ends.

SUMMARY OF INVENTION

In accordance with one aspect of the present invention, a leveling device includes a holder defining an xz-plane. A first accelerometer is mounted on the holder at an angle such that the first accelerometer is sensitive to movement of the first accelerometer in an xy-plane. The first accelerometer includes a first flexure plate generating a first accelerometer signal in response to movement of the first flexure plate. A second accelerometer is coupled to the holder an angle such that the second accelerometer is also sensitive to movement of the second accelerometer in the xy-plane, the second accelerometer comprising a second flexure plate generating a second accelerometer signal in response to movement of the second flexure plate.

In accordance with another aspect of the present invention, a method for operating a leveling system includes generating a first accelerometer signal from a first flexure plate accelerometer and generating a second accelerometer signal from a second flexure plate accelerometer. A platform rotates clockwise when the first accelerometer signal is greater than the second accelerometer signal, and the platform rotates counter-clockwise when the second accelerometer signal is greater than the first accelerometer signal. A third accelerometer signal is generated from a third flexure plate accelerometer, and a fourth accelerometer signal is generated from a fourth flexure plate accelerometer. The platform rotates clockwise when the third accelerometer signal is greater than the fourth accelerometer signal, and the platform rotates counter-clockwise when the fourth accelerometer signal is greater than the third accelerometer signal.

One advantage of the present invention is that it generates a dynamic range and granularity sufficient for Inter-Continental Ballistic Missile (ICBM) usage. Additional advantages include that the leveling device consumes less power than prior leveling devices, while dramatically improving reliability and reduction in manufacturing costs.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF DRAWINGS

In order that the invention may be well understood, there will now be described some embodiments thereof, given by way of example, reference being made to the accompanying drawings, in which.

DETAILED DESCRIPTION

The present invention is illustrated with respect to an aeronautical system including an accelerometer augmented leveling device (AALD) or a variable capacitance bridge accelerometer (VCBA), particularly suited to the aeronautical field. The present invention is, however, applicable to various other uses that may require leveling devices, such as any system requiring initialization or stabilization measurements both at start-up and in operation under extreme conditions, as will be understood by one skilled in the art.

Figure 1:
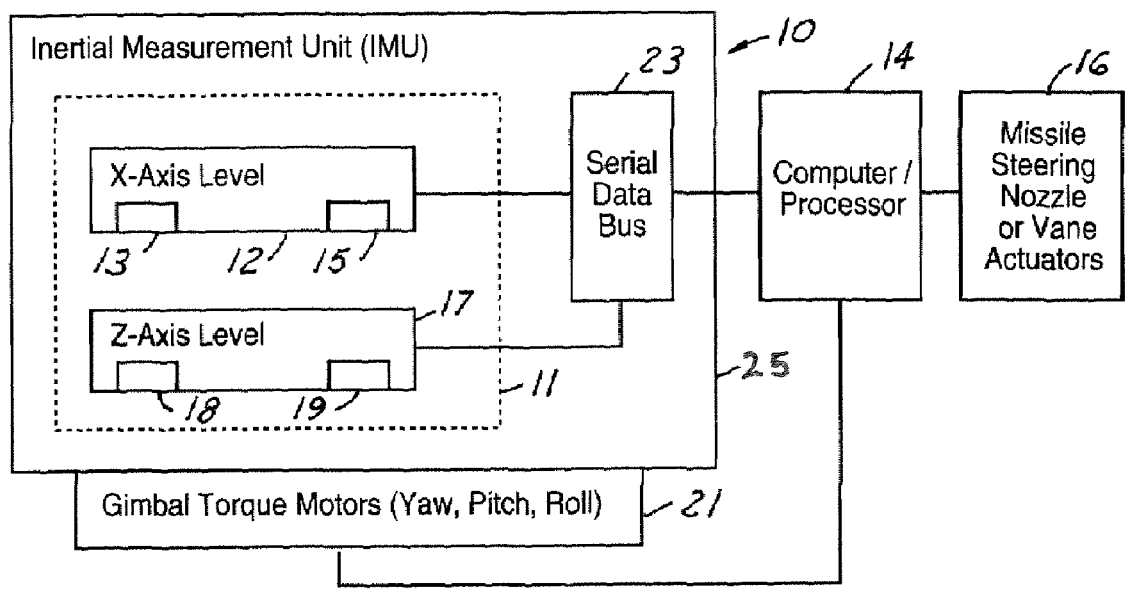
FIG. 1 illustrates an aeronautical system including a leveling device in accordance with one embodiment of the present invention.

Referring to FIG. 1, the aeronautical system 10 (here illustrated as a Minuteman III missile system), including a leveling device 11 having two levels 12 and 17, is illustrated. The aeronautical system 10 is merely an illustrative example of an object requiring leveling and is not meant to be limiting. For example, the present levels 12 and 17 could be implemented in any accelerating object to sense leveling forces, including any type of vehicles.

The sections of the leveling device 11 are included within an inertial measurement unit 25 (IMU). Within the leveling device, the x-axis level 12 and z-axis level 17 are coupled to a holder, here embodied as gimbals and gimbal torque motors 21 (yaw, pitch or roll motors). The levels 12 and 17 are also coupled to a serial bus 23, which transfers information to a computer/processor 14. The processor 14 is also coupled to the missile steering nozzle (or vane actuators) unit 16 and the gimbal torque motors 21.

Figure 2:
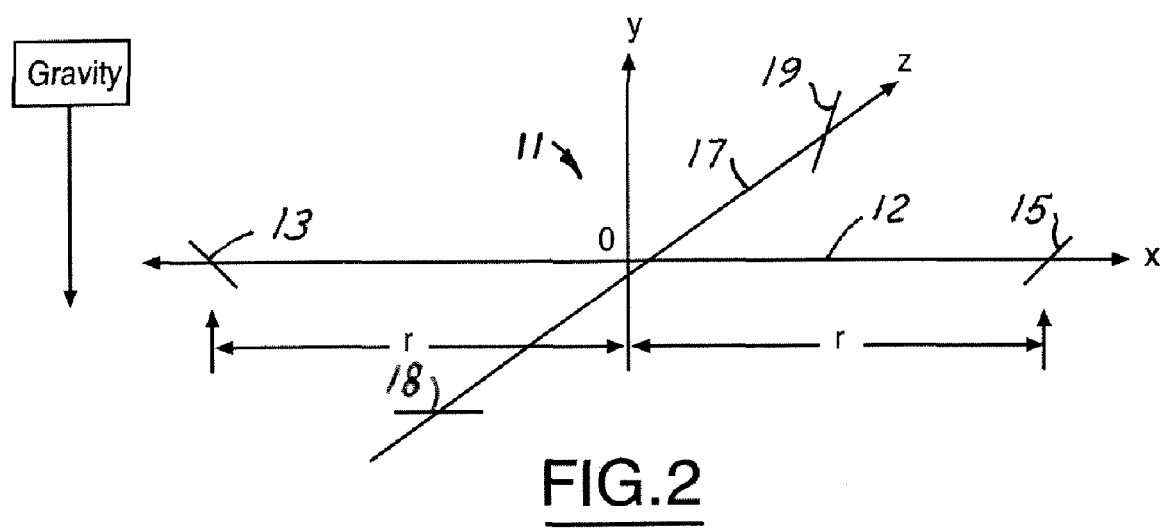
FIG. 2 illustrates a perspective view of a leveling system in accordance with FIG. 1.
Figure 3:
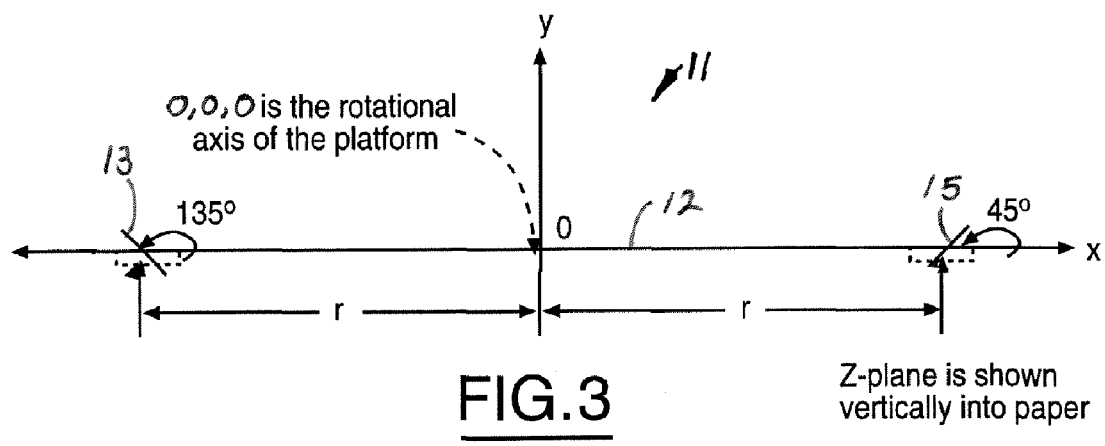
FIG. 3 illustrates an xy axis side view of the leveling system of FIG. 2.
Figure 4:
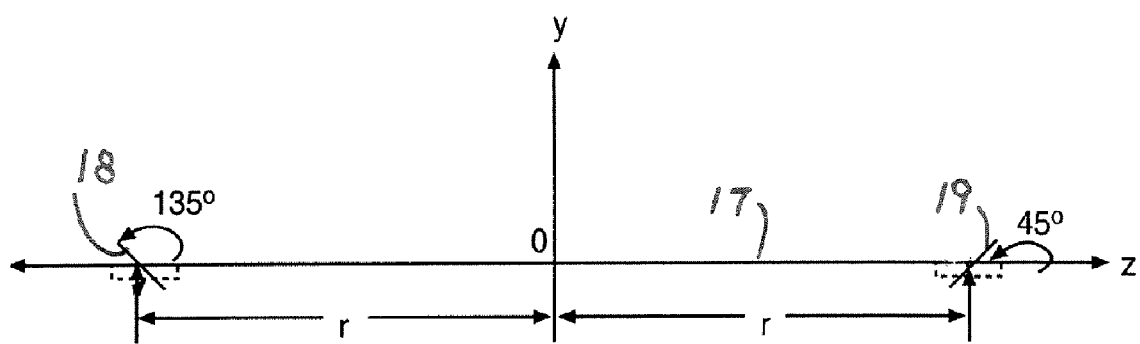
FIG. 4 illustrates a yz axis side view of the leveling system of FIG. 2.

Referring to FIGS. 2, 3 and 4, a simplified implementation diagram of the acceleration augmented leveling device 11, in accordance with one embodiment of the present invention, is illustrated.

The accelerometer augmented leveling device 11 is embodied as a four accelerometer device that generates a precise measurement of the orientation of a plane with respect to the earth. The leveling device 11 includes four flexure plate accelerometers 13 (first), 15 (second), 18 (third), 19 (fourth), each of which may be configured as illustrated in either FIG. 5 or FIG. 6. Each accelerometer 13, 15, 18, 19 is embodied as a single axis accelerometer that can provide a reliable wide dynamic range of performance.

Figure 5:
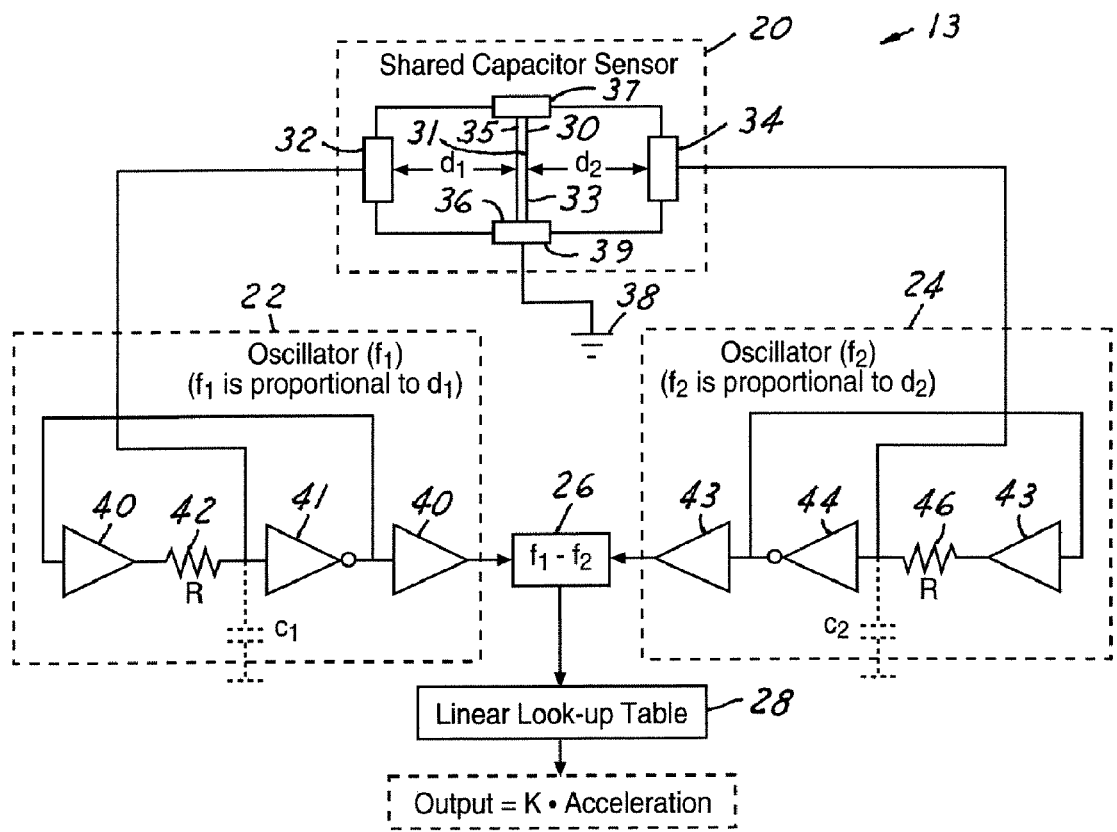
FIG. 5 illustrates a flexure plate dual capacitance accelerometer system in accordance with FIG. 1.
Figure 6:
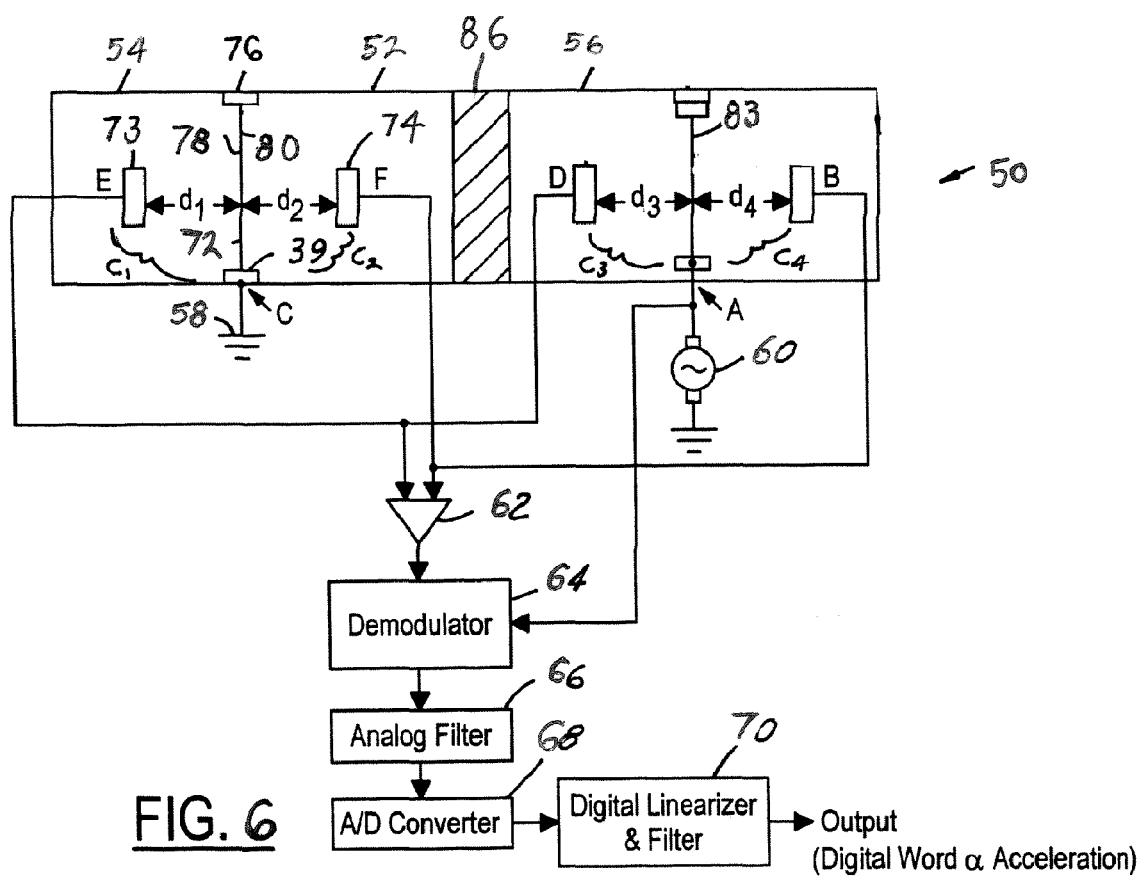
FIG. 6 illustrates a bridge accelerometer system in accordance with FIG. 1.

Four accelerometers as in FIGS. 5 or 6, configured per FIG. 2 are included to implement the leveling device 11. The accelerometers 13 and 15 have centers which are located on the x-axis on the xz plane. Accelerometer 13 has a mounting angle of 135 degrees with respect to the x-axis, indicating it has a sensitive axis at 45 degrees with respect to the x-axis and has no z component. Accelerometer 15 is similarly mounted at 45 degrees with respect to the x-axis, resulting in a sensitive axis of 135 degrees. The center of each accelerometer is located at a distance r from the origin O. Important to note is that the mounting angles and the distances from the origin included herein are merely illustrative examples of an efficient possible arrangement of the accelerometers 13, 15, 18, 19. Alternate embodiments include the accelerometers 13, 15, 18, 19 at varying known distances that may or may not be identical and varying known mounting angles, which also may or may not be identical.

Accelerometers 18 and 19 have centers located on the z-axis on the xz plane. Accelerometer 18 has a mounting angle of 135 degrees with respect to the z-axis, indicating its sensitive axis is at 45 degrees with respect to the z-axis, and has no x component. Accelerometer 19 is similarly mounted at 45 degrees with respect to the z-axis, making the sensitive axis 135 degrees. The center of each device is located at a distance r from the origin.

The centers of all accelerometers 13, 15, 18, 19 are located in the xz-plane. The xz-plane is the surface which will be leveled and is assumed to be a uniformly flat structure. Although this may not be always true in practice, the deviations may be calibrated at manufacture.

In the present invention, the accelerometers 13, 15, 18, 19 are equidistant from the central y-axis. This is merely one possible arrangement, and, in fact, they may both be included on either side of the origin, on the conditions that they are separated by a known distance and at a known distance from the origin.

The xz surface has controls, such as gimbal torque motors 21 or missile steering 16, which allow rotation about the x-axis or z-axis. The leveling device 11 will also be rotated about the y-axis in order to establish the direction of earth rotation so that these effects may be measured and calibrated out.

Initially, the device will monitor the angle of each accelerometer 13, 15, 18, 19, and the result will drive the controls of each axis to result in an equal output of each pair of accelerometers 13 and 15, 18 and 19. When they are all equal, they all measure earth's gravity at a 45 degree angle or an angle whose sine equals 45 degrees (135 degrees). Any deviation causes errors in the opposite polarity, this results in unique null conditions for the control loop.

Referring to FIG. 5, an example of a possible configuration for the accelerometer 13 is included as an illustrative example of the four accelerometers 13, 15, 18, and 19. The accelerometer 13 is part of an inertial measurement unit 25 (IMU), as was previously discussed. The level 12 includes a shared capacitor sensor 20, two oscillators 22, 24, a frequency subtraction device 26, and a Linear Lookup Table (LLT) or linearizer 28.

The shared capacitor sensor 20 includes a single flexure plate 30, two parallel fixed plates 32, 34, and a metal housing structure 36. The shared capacitor sensor 20 generates phase shift capacitance signals in response to acceleration of the aeronautical system 10, as will be discussed later.

The flexure plate 30 is positioned between the two fixed plates 32, 34 such that the first fixed 32 plate is a first distance ($d_1$) from a first side 31 and the second fixed plate 34 is a second distance ($d_2$) from a second side 33 of the flexure plate 30. The flexure plate 30 is affixed to the metal housing structure 36 through at least a portion of at least one edge 37 of the flexure plate 30, which is coupled to both ends of the flexure plate 30 and is also coupled to a ground 38. The present invention, however, includes the flexure plate 30 coupled at two edges 37, 39 for a square embodiment of the plate 30.

In the present embodiment, the flexure plate 30 is circular and coupled to the housing 36 at only one edge 37. However, numerous other shapes are included, as will be understood by one skilled in the art. The flexure plate includes a first side 31, a second side 37 and a common edge 35. The flexure plate is rigidly fixed to the metal housing structure through almost any manner known in the art. Resultantly, all the system flexure is generated within the flexure plate 30. This generally increases reliability and robustness of the system 10. This, however, generates a non-linear output from the flexure plate 30, which will be discussed regarding the linear lookup table linearizer 28.

A gas or vacuum environment is enclosed within the sensor 20 through the metal housing structure 36 such that there is no interference with the movement of the flexure plate 30 other than the acceleration of the system 10 along a perpendicular axis. During acceleration, the flexure plate 30 flexes according to the reaction force of Newton's second law of motion, force=mass×acceleration (F=ma), causing the distance between the flexure plate 30 and the fixed plates 32, 34 to vary, thus creating the two variable capacitors, one on each side of the flexure plate 30.

The combination of the first fixed plate 32 and the flexure plate 30 forms a first parallel plate capacitor, and the combination of the second fixed plate 34 and the flexure plate 30 forms the second parallel plate capacitor. The equivalent capacitor for the first parallel plate capacitor is illustrated in broken lines as $C_1$, and the equivalent capacitor for the second parallel plate capacitor is illustrated in broken lines as $C_2$.

The capacitance of the parallel plate capacitors is determined by $$C \cong (\epsilon_0 A)/d,$$

where $\epsilon_0$ is the permittivity constant, A is the area of a fixed plate 32 or 34 (if I is the length of one side and the cross section of the plate is square, then $A=I^2$) and d is the effective distance between the flexure plate 30 and one of the fixed plates 32, 34.

The first fixed plate 32 is coupled to the metal housing structure 36 and positioned a first distance ($d_1$) from the flexure plate 30. The first fixed plate 32 and the flexure plate 30 form a first capacitor whose operation is also governed by the equation $$C \cong (\epsilon_0 A)/d.$$

The capacitance of the first fixed plate 32 responds to movement of the flexure plate 30 when $d_1$ either increases or decreases, thereby generating a first phase shift capacitance signal.

The second fixed plate 34 is also coupled to the metal housing structure 36 and positioned a first distance ($d_1$) from the flexure plate 30. The second fixed plate 34 and the flexure plate 30 form a second capacitor whose operation is governed by the equation $$C \cong (\epsilon_0 A)/d.$$

The second fixed plate 34 responds to movement of the flexure plate 30 when $d_2$ either increases or decreases, thereby generating a second phase shift capacitance signal.

The distances ($d_1$ and $d_2$) between the flexure plate 30 and the fixed plates 32, 34 are a function of acceleration and are proportional or equal when the system 10 is at rest. Each fixed plate 32, 34 is connected to a respective oscillator 22, 24, which generates the phase shift capacitance necessary for predictable oscillation.

The first fixed plate 32 is coupled to the first oscillator 22, and the second fixed plate 34 is coupled to the second oscillator 24. The two oscillators 22, 24 are coupled to a frequency subtraction device 26, and the frequency subtraction device 26 is coupled to the LLT 28, which is coupled to a processor 14 (missile operations processor). The processor 14 is coupled to an actuator 16, and to various system components 11, as well as thrusters and attitude control devices.

The oscillators 22, 24 are ideally precision designs utilizing GaAs or similar material. The oscillators 22, 24 are also mounted on the metal housing structure 36 in the present embodiment.

The embodied first oscillator 22 includes components well known in the art. Although the embodied oscillator is a common oscillator type, one skilled in the art will realize that numerous other types of oscillators will also be adaptable for the present invention. The various components include, but are not limited to, two buffers, 40, an inverter 41, and at least one resistor 42. The first oscillator 22 receives the phase shift capacitance signal from the first fixed plate 32 and generates therefrom a frequency signal ($f_1$), which is inversely proportional to $d_1$.

The second oscillator 24 receives the phase shift capacitance signal from the second fixed plate capacitor and generates therefrom a second frequency signal ($f_2$), which is inversely proportional to $d_2$. The embodied oscillator 24 is similar to the first oscillator 22 and also includes a set of buffers 43, an inverter 44, and at least one resistor 46.

The frequencies ($f_1$ and $f_2$) are functions of the distances ($d_1$ and $d_2$) respectively. As the flexure plate 30 flexes, one capacitor increases and the other decreases, thereby causing one oscillator 22 to increase output frequency and the other oscillator 24 to decrease output frequency.

The frequency subtraction device 26 receives the oscillator signals ($f_1$ and $f_2$) and generates the difference thereof, i.e. $f_1-f_2$. Important to note is that the polarities of both $f_1$ and $f_2$ are determined before this difference is calculated. An resultant frequency signal is generated from the frequency subtraction device 26.

A linearizer 28 or LLT receives the overall frequency signal. The linearizer 28 compensates for both the nonlinear function generated from the frequency subtraction device 26 and any manufacturing anomalies, as will be understood by one skilled in the art. The linearizer 28 value is established in manufacturing through taking large samples of performance curves, as will be understood by one skilled in the art. The linearizer 28 output is a digital word whose magnitude is proportional to the acceleration of the system 10 in either direction along an axis perpendicular to the flexure plate 30.

Numerous alternate linearizers are also included in the present embodiment whereby a substantially linear function can be generated by compensating for nonlinear functions, for example, in the digital domain, a digital linearizer is included. The output of the linearizer 28 is an acceleration signal multiplied by a constant (k).

Statistical filtering of the linearized data somewhere significantly above the maximum flexure frequency also occurs in either the linearizer 28 or the processor 14 to reduce the overall noise impact on the system 10.

Important to note is that for the present invention, the two accelerometers 13, 15 generate output signals F1 and F2 respectively, whereas accelerometers 18, 19 generate output signals F3 and F4 respectively.

The processor 14 receives the output signals and generates a processor signal and response thereto. The processor 14 is embodied as a typical missile or airplane processor, as is familiar in the art.

The processor 14 accepts the output of each accelerometer pair and applies the compensation and calibration corrections derived from manufacturing and the earth rate calibration scheme. As the control loop drives the xz plane to null, the processor 14 monitors the system 10 so that all conditions are met, and the processor 14 also issues a level acquired indicator, for launch time or utilization time, and this position will be locked as the reference plane.

The actuator, here embodied as missile steering nozzle or vane actuators 16 receives the processor signal and activates system components (e.g. object control devices) in response thereto. System components include for example, thrusters or attitude control devices.

Referring to FIG. 6, a bridge accelerometer in accordance with another example of a possible flexure plate accelerometer design from FIGS. 1, 2 and 3 is illustrated. Each bridge accelerometer 50 or variable capacitance bridge accelerometer (VCBA) is an example of one or all of the four accelerometers 13, 15, 18, and 19 and is a single axis accelerometer that generates a robust wide dynamic range of performance. Important to note is that alternate embodiments of the present invention have one or more accelerometers, the illustrated accelerometers 13, 15, 18, and 19 are only one example of a possible arrangement of accelerometers, and any number of accelerometers can be utilized. Furthermore, a combination of different flexure plate accelerometer designs may also be utilized in accordance with the designs included in FIGS. 5 and 6 or any alternate flexure plate design known in the art.

As was mentioned, the accelerometer 50 will be described as an illustrative example of the four accelerometers 13, 15, 18, and 19 in this embodiment. The accelerometer 50 is part of the inertial measurement unit 25 and includes a housing 52, a flexured plate section 54, a rigid plate section 56, a ground 58, an AC source 60, a differential amplifier 62, a demodulator 64, an analog filter 66, an analog-to-digital converter 68, and a digital linearizer and filter 70.

The housing 52 or metal housing structure encloses four capacitors, which will be discussed later. A gas or vacuum environment is also enclosed therein such that there is no interference with the movement of the flexure plate 72 other than the acceleration of the system 10 along a perpendicular axis.

The flexured plate section 54 includes a single flexure plate 72 and two parallel fixed plates 73, 74. The rigid plate section 56 includes a rigid plate and two fixed plates. The two sections are electrically isolated and enclosed in a metal housing structure 52.

In the present embodiment, the flexure plate 72 is coupled to the housing 52 at only one edge 76. Numerous other attachment points are, however, included, as will be understood by one skilled in the art. The flexure plate 72 includes a first side 78, a second side 80 and a common edge 76.

The flexure plate 72 is positioned between the first and second fixed plates 73, 74 such that the first fixed plate 73 is a first distance ($d_1$) from the first side 78 and the second fixed plate 74 is a second distance ($d_2$) from the second side 80 of the flexure plate 72. The flexure plate 72 is affixed to the metal housing structure 52 through at least a portion of the common edge 76 of the flexure plate 72, which is also coupled to a ground 58.

The flexure plate is rigidly fixed to the metal housing structure 52 through almost any manner known in the art. Resultantly, all the system flexure is generated within the flexure plate 72. This generally increases reliability and robustness of the system 10. This, however, generates a non-linear output from the flexure plate 72, which will be discussed regarding the linearizer 70.

The combination of the first fixed plate 73 and the flexure plate 72 forms a first parallel plate capacitor, and the combination of the second fixed plate 74 and the flexure plate 72 forms the second parallel plate capacitor.

The capacitance of the parallel plate capacitors is determined by the following:

$$C \cong (\epsilon_0 A)/d,$$

where $\epsilon_0$ is the permittivity constant, A is the area of a fixed plate, and d is the effective distance between the flexure plate 72 and one of the fixed plates 73, 74.

The first fixed plate 73 is coupled to the metal housing structure 52 and positioned a first distance ($d_1$) from the flexure plate 72. The first fixed plate 73 and the flexure plate 72 form a first capacitor whose operation is also governed by the equation $$C \cong (\epsilon_0 A)/d.$$

The first fixed plate 73 responds to movement of the flexure plate 72 when $d_1$ either increases or decreases, thereby generating a first phase shift capacitance signal.

The second fixed plate 74 is also coupled to the metal housing structure 52 and positioned a second distance ($d_2$) from the flexure plate 72. The second fixed plate 74 and the flexure plate 72 form a second capacitor whose operation is governed by the equation $$C \cong (\epsilon_0 A)/d.$$

The second fixed plate 74 responds to movement of the flexure plate 72 when $d_2$ either increases or decreases, thereby generating a second phase shift capacitance signal.

The distances ($d_1$ and $d_2$) between the flexure plate 72 and the fixed plates 73, 74 are a function of acceleration and are proportional or equal when the system 10 is at rest.

During acceleration, the flexure plate 72 flexes according to the reaction force of Newton's second law of motion, force=mass×acceleration (F=ma), causing the distance between the flexure plate 72 and the fixed plates 73, 74 to vary, thus creating the two variable capacitors, one on each side of the flexure plate 72.

A rigid plate section 56 is insulated by an insulator 86 from the flexure plate section 54. Third and fourth capacitors are formed on either side of the rigid plate 83 in a similar arrangement as the first and second capacitors.

The first and second capacitors ($C_1$, $C_2$) are formed on each side of the flexure plate 72 and the third and fourth capacitors ($C_3$, $C_4$) are formed on either side of the rigid plate 83. The four capacitors are electrically connected to form a bridge. The fixed capacitors (third and fourth) and rigid plate 83 are isolated from the flexure plate 72 and flexured plate capacitors (first and second). All capacitors are designed to be as nearly equal as possible when at rest.

The distance between the flexure plate 72 and the rigid plate 83 is a function of acceleration. The center of each bridge side is monitored to detect the differential amplitude. As the flexure plate 72 flexes in response to acceleration, one capacitor increases and the other decreases, thereby increasing the bridge voltage on one side and decreasing bridge voltage on the other.

The bridge is excited with an AC source 60 at one end and grounded at the other. The ground 58 is coupled to the flexure plate 72 and the AC source 60 is coupled to the rigid plate 83. The two capacitive legs ($C_3$, $C_1$) and ($C_4$, $C_2$) of the bridge produce two voltage dividers, each of which provides a terminal (ED, FB), to measure the resulting voltage.

The bridge configuration reduces the temperature sensitivity and the AC excitation allowing narrow band analog filtering, both of which enhance the signal-to-noise ratio. The bridge circuitry utilizes GaAs or high speed CMOS, as the accuracy required for performance will require low propagation delays.

The voltage phase of the accelerometer signals includes a direct indication of the direction of acceleration. This output is gain adjusted if required in the differential amplifier 62, and received in the demodulator 64, which rectifies the waveform as a function of the reference excitation phase from the AC source 60. The resulting waveform is then filtered in the analog domain in the analog filter 66 and received in an analog-to-digital converter 68 where the data becomes a digital word.

The digital word is then filtered and linearized in the digital linearizer and filter 70 for manufacturing and flexure non-uniformities. This output is a digital word having a magnitude proportional to the acceleration of the system in either direction along the perpendicular axis. The output of the linearizer 50 is an acceleration signal multiplied by a constant (k).

Statistical filtering of the linearized data somewhere significantly above the maximum flexure frequency also occurs in either the digital linearizer and filter 70 or the processor 14 to reduce the overall noise impact on the system 10. The compensation for the non-linearity of the flexure structure and overall transport error is compensated for by the linearizer and filter 70 whose values are established in manufacturing through sampling performance curves.

The processor 14 receives the acceleration signal multiplied by the constant and generates a computer signal and response thereto.

Figure 7:
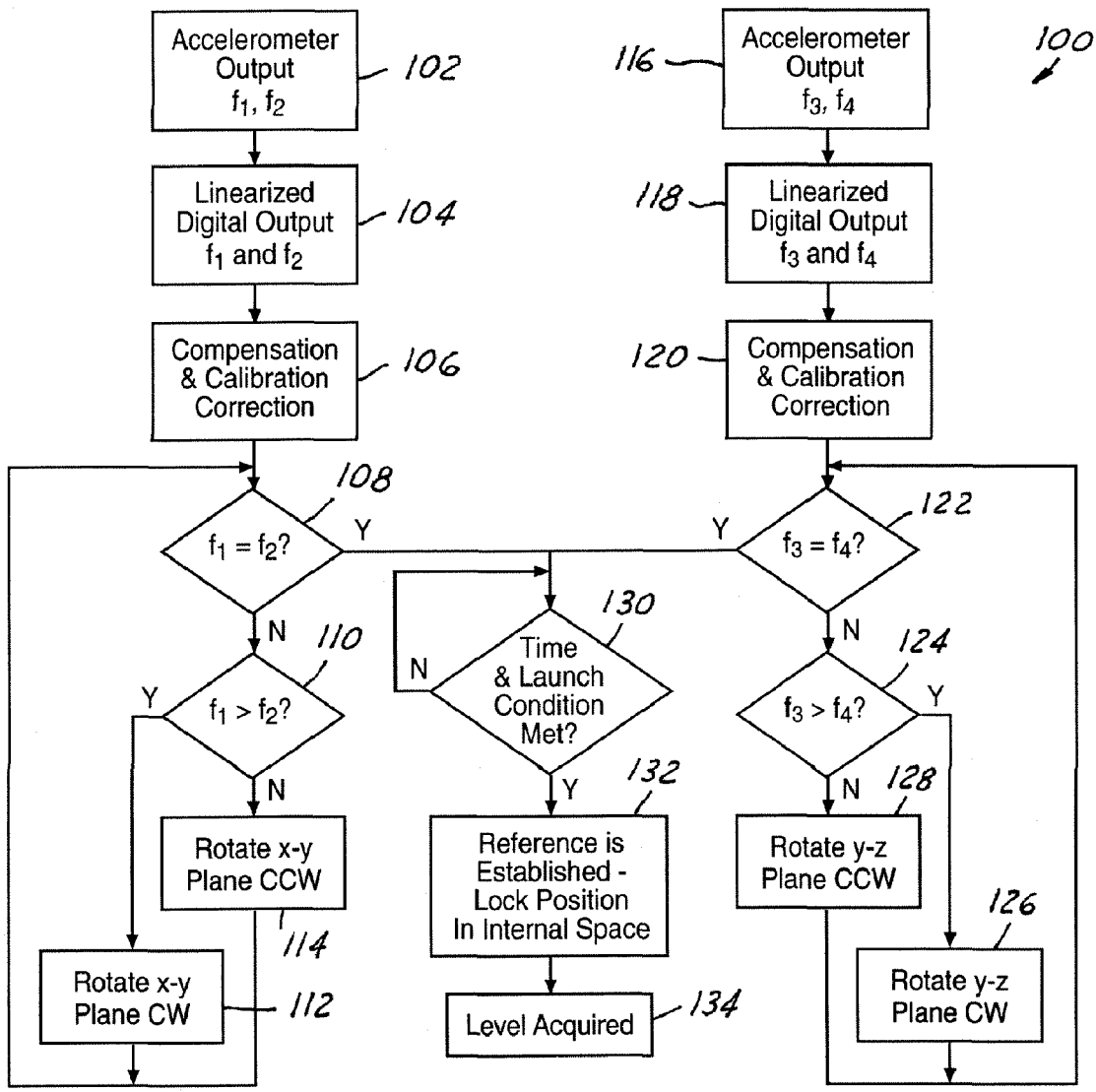
FIG. 7 illustrates a logic flow diagram of the aeronautical system of FIG. 1 in operation, in accordance with another embodiment of the present invention.

Referring to FIG. 7, a logic flow diagram 100 illustrating a method for leveling control is illustrated. The logic (which may be included in the processor 14) includes two control loops, one for the xy plane, and the other for the yz plane.

xy plane logic starts in operation block 102 where accelerometer outputs F1 and F2 are received in the processor 14. In operation block 104, the processor 14 linearizes the digital outputs F1 and F2. In operation block 106, the processor 14 compensates for signal noise and calibrates the signals using position and orientation data either obtained from other sensors or input by a technician.

In inquiry block 108, a check is made whether F1 equals F2. For a negative response, inquiry block 110 activates, and a check is made whether F1 is greater than F2. For a positive response, in operation block 112, the xy plane rotates clockwise by the thrusters or other missile actuators. Otherwise, in operation block 114, the xy plane rotates counter-clockwise.

The yz plane logic starts in operation block 116 where accelerometer outputs F3 and F4 are received in the processor 14. In operation block 118, the processor 14 linearizes the digital outputs F3 and F4. In operation block 120, the processor 14 compensates for signal noise and calibrates the signals using position and orientation data either obtained from other sensors or input by a technician.

In inquiry block 122, a check is made whether F3 equals F4. For a negative response, inquiry block 124 activates, and a check is made whether F3 is greater than F4. For a positive response, in operation block 126, the yz plane rotates clockwise by the thrusters or other missile actuators. Otherwise, in operation block 128, the yz plane rotates counter-clockwise.

For a positive response to both inquiry block 108 and inquiry block 122, in inquiry block 130, a check is made whether time and launch conditions are met. For a negative response, inquiry block 130 loops until time and launch conditions are met.

Otherwise, in operation block 132, a reference is established, and the position of the missile system 10 is locked in inertial space. In operation block 134, the leveling process is completed, and the platform is level.

In operation, a method for operating a leveling system includes generating a first accelerometer signal from a first flexure plate accelerometer and generating a second accelerometer signal from a second flexure plate accelerometer. A platform rotates clockwise when the first accelerometer signal is greater than the second accelerometer signal, and the platform rotates counter-clockwise when the second accelerometer signal is greater than the first accelerometer signal. A third accelerometer signal is generated from a third flexure plate accelerometer, and a fourth accelerometer signal is generated from a fourth flexure plate accelerometer. The platform rotates clockwise when the third accelerometer signal is greater than the fourth accelerometer signal, and the platform rotates counter-clockwise when the fourth accelerometer signal is greater than the third accelerometer signal. In other words, the missile computer/processor/processor 14 controls the pre-flight profile and flight profile through the missile nozzle or steering vane actuators or platform control system.

This process is typically engaged when the missile is at rest, prior to launch, in flight. A calibration procedure within the processor 14 allows compensation for the offset introduced by the rotation of the earth.

From the foregoing, it can be seen that there has been brought to the art a new and improved accelerometer system. It is to be understood that the preceding description of the preferred embodiment is merely illustrative of some of the many specific embodiments that represent applications of the principles of the present invention. For example, a vehicle, such as an airplane, spacecraft, or automobile could include the present invention for acceleration detection and control. Numerous and other arrangements would be evident to those skilled in the art without departing from the scope of the invention as defined by the following claims.

What is claimed is:

1. A leveling device comprising:
    a holder defining an xz-plane;
    a first accelerometer coupled to said holder at an angle such that said first accelerometer is sensitive to movement of said first accelerometer in an xy-plane, said first accelerometer comprising a first flexure plate generating a first accelerometer signal in response to movement of said first flexure plate;
    a second accelerometer coupled to said holder at an angle such that said second accelerometer is sensitive to movement of said second accelerometer in said xy-plane, said second accelerometer comprising a second flexure plate generating a second accelerometer signal in response to movement of said second flexure; and
    a processor generating a platform control signal in response to the first accelerometer signal and the second accelerometer signal.

2. The system of claim 1, wherein said first accelerometer and said second accelerometer are equidistant from or a known variable distance from an intersection of said xy-plane and a yz-plane.

3. The system of claim 1, further comprising a third accelerometer coupled to said holder at an angle such that said third accelerometer is sensitive to movement of said third accelerometer in a yz-plane, said third accelerometer comprising a third flexure plate generating a third accelerometer signal in response to movement of said third flexure plate.

4. The system of claim 3, further comprising a fourth accelerometer coupled to said holder at an angle such that said fourth accelerometer is sensitive to movement of said fourth accelerometer in said yz-plane, said fourth accelerometer comprising a fourth flexure plate generating a fourth accelerometer signal in response to movement of said fourth flexure plate.

5. The system of claim 4, wherein said third accelerometer and said fourth accelerometer are equidistant from or a known variable distance from an intersection of an x-axis, a y-axis and a z-axis.

6. The system of claim 5,
    the processor receives said first accelerometer signal, said second accelerometer signal, said third accelerometer signal and said fourth accelerometer signal and generates the platform control signal in response thereto.

7. The system of claim 1, further comprising:
    an actuator activating a system component in response to said platform control signal.

8. The system of claim 7, wherein said system component comprises a thruster or an attitude control device.

9. A method for operating a leveling system comprising:
    generating a first accelerometer signal from a first flexure plate accelerometer;
    generating a second accelerometer signal from a second flexure plate accelerometer;

rotating a platform clockwise when said first accelerometer signal is greater than said second accelerometer signal;
rotating said platform counter-clockwise when said second accelerometer signal is greater than said first accelerometer signal;
generating a third accelerometer signal from a third flexure plate accelerometer;
generating a fourth accelerometer signal from a fourth flexure plate accelerometer;
rotating said platform clockwise when said third accelerometer signal is greater than said fourth accelerometer signal; and
rotating said platform counter-clockwise when said fourth accelerometer signal is greater than said third accelerometer signal.

10. The method of claim 9, further comprising calibrating the leveling system in relation to the earth by rotating the system about an x-axis or a z-axis.

11. The method of claim 9, further comprising:
calibrating the leveling system in relation to a rotation of the earth by rotating the system about a y-axis;
measuring effects of said rotation; and
calibrating said effects out of future leveling calculations.

12. The method of claim 9, further comprising:
generating a level acquired indicator signal, and
locking said level acquired indicator signal as a reference plane.

13. A leveling system for a missile system comprising:
a missile housing;
a holder coupled to said missile housing and defining an xz-plane;
a first accelerometer coupled to said holder at an angle such that said first accelerometer is sensitive to movement of said first accelerometer in an xy-plane, said first accelerometer comprising a first flexure plate generating a first accelerometer signal in response to movement of said first flexure plate;
a second accelerometer coupled to said holder at an angle such that said second accelerometer is sensitive to movement of said second accelerometer in said xy-plane, said second accelerometer comprising a second flexure plate generating a second accelerometer signal in response to movement of said second flexure plate;
a processor coupled to said first accelerometer and said second accelerometer, said processor receiving said first accelerometer signal, said second accelerometer signal and generating a platform control signal in response thereto; and
an actuator activating an object control device in response to the platform control signal.

14. The system of claim 13, wherein said object control device comprises at least one of a thruster, an attitude control device, a missile steering nozzle, or a vane actuator.

15. The system of claim 13, wherein said processor calibrates the leveling system in relation to the earth by generating a rotation signal to rotate the leveling system about an x-axis or a z-axis, said processor further generating a signal to rotate the leveling system about a y-axis in response to a rotation of the earth, said processor further measuring effects of said rotation about said x-axis, said y-axis, or said z-axis, said processor still further calibrating said effects out of future leveling calculations.

16. The system of claim 13, further comprising a third accelerometer coupled to said holder at an angle such that said third accelerometer is sensitive to movement of said third accelerometer in a yz-plane, said third accelerometer comprising a third flexure plate generating a third accelerometer signal in response to movement of said third flexure plate.

17. The system of claim 16, wherein said second accelerometer and said third accelerometer are arranged with said first accelerometer to receive cross axis thrust data.

18. The system of claim 17, further comprising a serial data bus receiving accelerometer signals from said first accelerometer, said second accelerometer and said third accelerometer, said serial data bus further exchanging information with said processor.

19. The system of claim 16, further comprising a fourth accelerometer coupled to said holder at an angle such that said fourth accelerometer is sensitive to movement of said fourth accelerometer in said yz-plane, said fourth accelerometer comprising a fourth flexure plate generating a fourth accelerometer signal in response to movement of said fourth flexure plate.

20. The system of claim 19, wherein said processor further generates a level acquired indicator signal in response to said first accelerometer, said second accelerometer, said third accelerometer, and said fourth accelerometer, said processor further locking said level acquired indicator signal as a reference plane.

21. The system of claim 13, wherein said first accelerometer and said second accelerometer are flexure plate dual capacitance accelerometers.

* * * * *